April 21, 1925.

T. E. MURRAY, JR 1,534,133

WELDING

Filed Aug. 22, 1922

INVENTOR
Thomas E. Murray, Jr

ATTORNEY

Patented Apr. 21, 1925.

1,534,133

UNITED STATES PATENT OFFICE.

THOMAS E. MURRAY, JR., OF BROOKLYN, NEW YORK.

WELDING.

Application filed August 22, 1922. Serial No. 583,522.

*To all whom it may concern:*

Be it known that I, THOMAS E. MURRAY, Jr., a citizen of the United States, residing in Brooklyn, county of Kings, and State of New York, prays that Letters Patent of the United States be granted to him for Improvements in Welding, of which the following is a specification.

Various difficulties have been found in welding together the edges of a single metal part in the making of tubular and similar products, and my present invention provides a process by which this can be done easily and with other advantages referred to in detail hereinafter.

The accompanying drawings illustrate embodiments of the invention.

Figure 1:
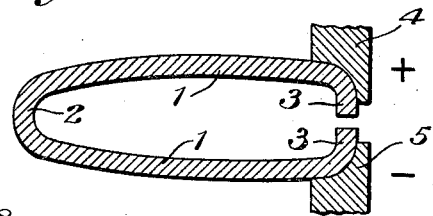
Figs. 1, 2 and 3 illustrate successive stages in the making of a cylindrical object.

Referring to the embodiments of the invention illustrated, a sheet of metal is bent by means of any usual or suitable pressing or rolling mechanism to the shape shown in Fig. 1 with two opposite long sides 1 connected by a sharply curved portion 2 and with end portions 3 at the edges which are bent at approximately right angles to the long sides 1. The edge portions are then embraced between electrodes 4 and 5 by which the edges are pressed together and an electric current is passed between the electrode and the meeting edges of the work while the pressure is maintained and thus a good butt weld is formed. Various welding methods may be used such for example as the Murray method in which a current of extremely large amperage per cross-section of contact area, say 90,000 amperes per square inch, is passed for a very brief interval of time, say a second or less. The invention is particularly advantageous with this and similar butt welding methods, but in its broad aspects has advantages also with various other welding methods.

Both mechanically and electrically, this shape is better adapted to the welding operation than a circular shape would be. Not only are there advantages in operation, but also this process makes possible the production of tubular or ring shaped articles from thicker sheet metal than was possible with previous methods of electrically welding articles of this character.

The oblong shape of the blank, with its major axis at least twice as long as its minor axis, provides a greater leverage at the edges which are to be pressed together than if the work were circular or nearly so. The end portions 3 are practically flat for a considerable distance back from the edges, and at right angles to the longitudinal axis; so that when they are pressed together and a part of the metal is taken up or extruded at the joint, these parts of the work do not change their inclination but remain substantially at right angles to the major axis. By reason of this shape also, the edges of the metal at the joint make a good flat contact with each other throughout the thickness of the metal. Also, the electrodes are located close to the ends of the work so that their pressure is exerted on the joint in a direction normal thereto and to the major axis. For this purpose it is preferable to arrange the electrodes as shown near the free ends of the work; and preferably against that portion of the work which lies within the fourth part of the diameter.

This arrangement has also certain electrical advantages. First, the portion of the work immediately adjacent to the parts 3 are nearly flat and parallel to the major axis so that the electrodes have a practically normal bearing upon the work and there is no such shifting of the contact as takes place during a welding operation when the bearing is on an oblique surface. In the second place, the location of the electrodes over less than one-fourth of the diameter of the work causes practically all the current from one electrode to another to pass through the joint and little or none of it to pass around through the closed portion 2 of the work, although the latter forms a continuous path for the current. Also the bringing of the end of the electrode near the joint concentrates the heat in a small quantity of metal back of the joint and thus prevents loss by radiation and makes a more efficient operation. This is particularly important with the Murray method above referred to.

With the above considerations in view, it is apparent that within reasonable limits the greater the ratio of the longer diameter of the work to the shorter, the greater the advantage. I prefer, as in the case illustrated, to bend the work to such a shape that its longer diameter will be about two or more times as great as the shorter diameter.

Figure 4:
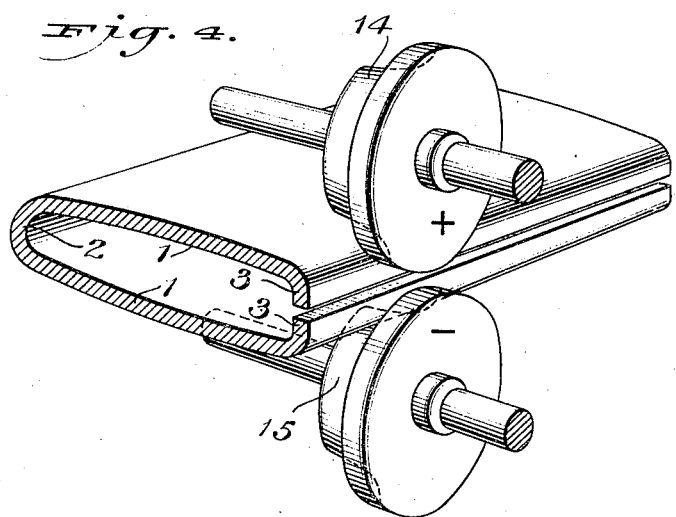
Fig. 4 illustrates a modification.

Fig. 4 illustrates an extreme case in which the shorter diameter is made only sufficient to secure the desired width of the parts 3, the remainder of the metal being taken up with the curved connection 2 opposite the joint, and the sides 1 which are approximately flat throughout their extent.

Figure 2:
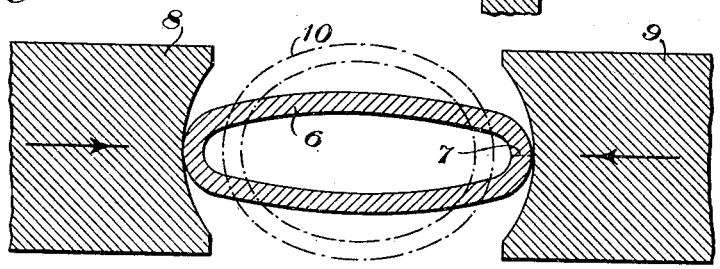
Figure 3:
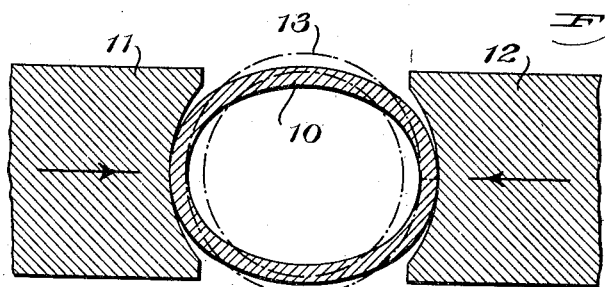

The tube, being formed of the elongated or irregularly oblong shape in Fig. 1, can readily be converted to a circular or other cross-section as desired by means of pressure applied externally. For example, in Figs. 2 and 3 such an operation is illustrated in two successive steps. The product of Fig. 1, which is marked 6 and which has a welded joint 7 at one end, is placed with its long diameter between two plungers 8 and 9 with curved ends bearing against the work. These plungers are advanced and bring the work to the substantially or approximately elliptical shape 10. The work is then brought between a second pair of plungers 11 and 12 as indicated in Fig. 3 with circular bearing ends, and the pressing of these together bends the work to the circular shape shown at 13. Instead of bringing the work to a circle in cross-section it may be converted to any other shape desired by suitably shaping the ends of the plungers and, if necessary, by using inside cores. The plunger arrangement shown is probably the best for short lengths of tubing. For great lengths it might be preferable to use shaping rolls such as are well known in the manufacture of welded tubing. And cross rolls or other known means for straightening the tubes may be used, if nesessary.

For making considerable lengths of tubing we may also use a progressive welding operation. In this case the blank of the same shape as in Fig. 1 is placed between rolling electrodes 14 and 15, Fig. 4. By means of these electrodes the edges of the work are pressed together at one end, the current is passed and the rolls are gradually advanced along the length of the joint at a rate dependent on the character of the work and the current employed and calculated to effect a good weld continuously from end to end. The misshapen tube thus formed can then be shaped as desired by the methods above described.

Though I have described with great particularity of detail certain embodiments of my invention yet it is not to be understood therefrom that the invention is restricted to the particular embodiment disclosed. Various modifications thereof in details and in the instrumentalities employed may be made by those skilled in the art without departing from the invention as defined in the following claims.

Reference is made to a prior application of Murray and Williams No. 572,394 filed July 3rd, 1922, for broad claims on the welding of the parts and the subsequent reshaping of them; the present application, in respect to this feature, being specific to said Murray and Williams application.

What I claim is—

1. The herein described method of electrically welding the ends of a single piece of metal which consists in bending it to a hollow compartively flat shape with meeting edges at an end of the longer dimensions of its cross-section and with flat portions of substantial width adjacent to such edges approximately at right angles to the longer dimensions and butt welding such edges to each other by pressing them together by means of electrodes in line with such edges and passing a current between said electrodes and across the joint.

2. The herein described method of electrically welding the ends of a single piece of metal which consists in bending it to a hollow compartively flat shape with meeting edges at an end of the longer dimensions of its cross-section and with flat portions of substantial width adjacent to such edges approximately at right angles to the longer dimensions and butt welding such edges to each other by pressing them together by means of electrodes in line with such edges and extending in contact with said flat portions nearly to said edges and passing a current between said electrodes and across the joint.

3. The herein described method of electrically welding the ends of a single piece of metal which consists in bending it to a hollow comparatively flat shape with meeting edges at an end of the longer dimensions of its cross-section and with flat portions of substantial width adjacent to such edges approximately at right angles to the longer dimensions and butt welding such edges to each other by pressing them together by means of electrodes in line with such edges and extending in contact with the work backward from such edges not more than one-fourth of said longer dimension and passing a current between said electrodes and across the joint.

4. The herein described method of electrically welding the ends of a single piece of metal which consists in bending it to a hollow comparatively flat shape with meeting edges at an end of the longer dimension of its cross-section and with flat portions substantially parallel to said longer dimension, pressing the edges together by means of electrodes bearing against said flat portions and passing a current between said electrodes and across the joint.

5. The herein described method of electrically welding the ends of a single piece of metal which consists in bending it to a hollow comparatively flat shape with meeting edges at an end of the longer dimension of its cross-section with flat portions of substantial width adjacent to such edges and substantially at right angles to the longer dimension and with other flat portions substantially parallel to the longer dimension, pressing such edges together by means of electrodes bearing against the parallel flat portions and engaging the right angle flat portions and extending back from the edges a distance not greater than one-fourth of the longer dimension and passing a current between said electrodes and across the joint.

6. The herein described method of electrically welding the ends of a single piece of metal which consists in bending it to a hollow shape flatter than the cross-section desired with meeting edges at an end of the longer dimension of its cross-section and with flat portions of substantial width adjacent to such edges approximately at right angles to the longer dimension and butt welding such edges to each other by pressing them together by means of electrodes in line with such edges and passing a current between said electrodes and across the joint and finally bending the welded product to the desired shape.

7. The herein described method of electrocally welding the ends of a single piece of metal which consists in bending it to a hollow shape with meeting edges at an end of the longer dimension and with such longer dimension at least twice as great as the shorter dimension and with flat portions at the edges at right angles to the longer dimension and of sufficient width to allow for the take-up of metal, pressing such edges together and passing a welding current across the joint.

In witness whereof, I have hereunto signed my name.

THOMAS E. MURRAY, Jr.